United States Patent [19]

Bartram et al.

[11] 4,008,597
[45] Feb. 22, 1977

[54] METHOD FOR SHAPING A SLIT PRODUCT
[75] Inventors: Ronald D. Bartram, Raleigh, N.C.; Charles J. Runkle, Guntersville, Ala.
[73] Assignee: Monsanto Company, St. Louis, Mo.
[22] Filed: Nov. 10, 1975
[21] Appl. No.: 630,462
[52] U.S. Cl. .................................. 72/199; 72/36 G
[51] Int. Cl.² .......................................... B21B 1/00
[58] Field of Search ............ 72/199, 226, 203, 366, 72/334

[56] References Cited
UNITED STATES PATENTS

| | | | |
|---|---|---|---|
| 1,076,439 | 10/1913 | McKibbin | 72/203 |
| 2,216,869 | 10/1940 | Yoder et al. | 72/203 |
| 2,775,151 | 12/1956 | Schumacher | 72/226 |
| 3,150,707 | 9/1964 | Howell | 72/179 X |

Primary Examiner—Milton S. Mehr
Attorney, Agent, or Firm—Donald J. Fitzpatrick; James W. Williams, Jr.

[57] ABSTRACT

A method is disclosed for shaping the cross-section of a slit product. After slitting the slit product is characterized by a burr formation that is detrimental to the mechanical properties of the product and must be eliminated. The method comprises the steps of positioning in engaging relationship a pair of revolving rolls and feeding the slit product into the rolls at an angle of 7°–30° with the tangent plane of the rolls.

1 Claim, 9 Drawing Figures

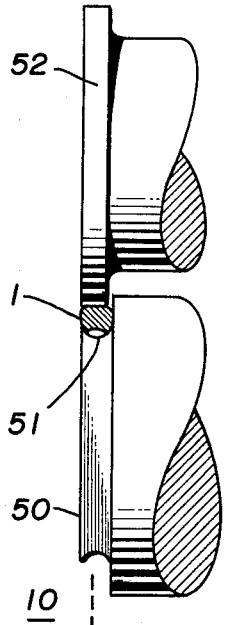
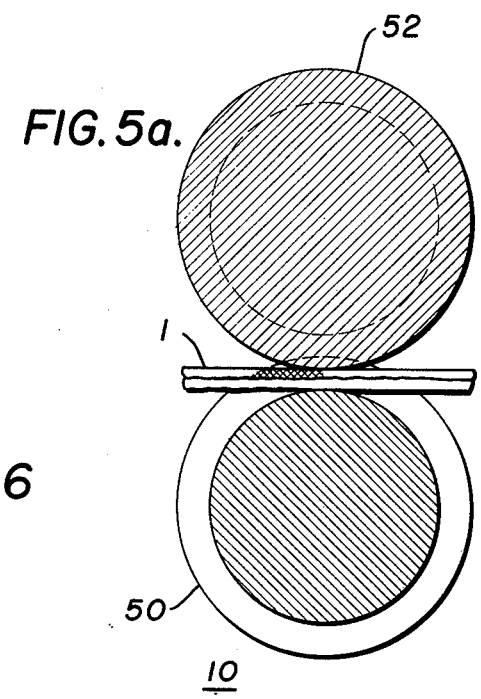
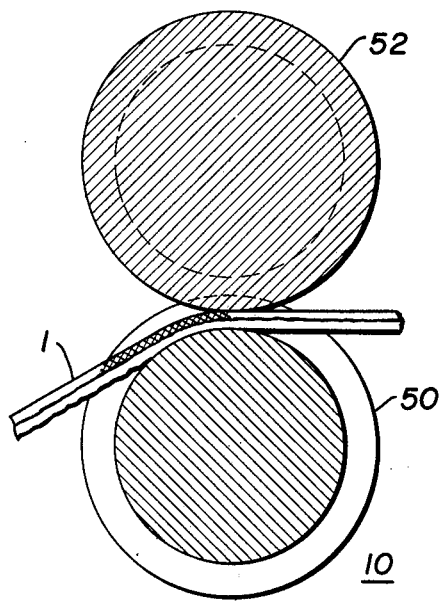
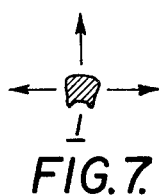
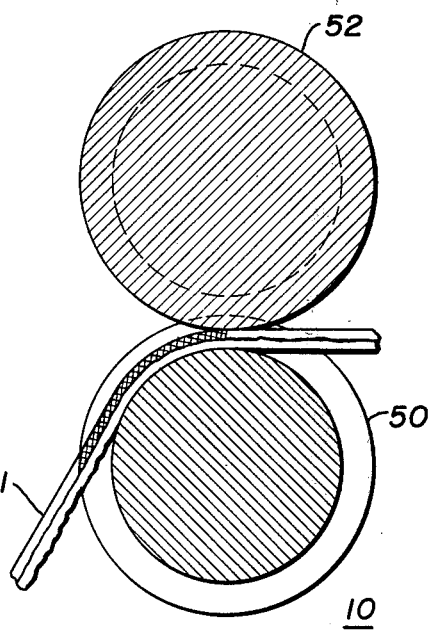

METHOD FOR SHAPING A SLIT PRODUCT

BACKGROUND OF THE INVENTION

1. Field of the Invention

This invention relates to a method for processing a slit product having a burr formation and more particularly to a method for shaping the cross-section of such a product.

2. Description of the Prior Art

In U.S. Pat. application Ser. No. 519,173, filed Oct. 30, 1974, "Apparatus for Slitting Coil Stock," now U.S. Pat. No. 3,939,745, there is disclosed an apparatus for precision slitting metallic coil stock into multiple continuous lengths of wire characterized by a small cross-sectional area. Slitting as disclosed in this application creates a burr formation on the cross-section of the slit product. A burr formation has been found to be detrimental for several reasons and must be removed and/or eliminated.

An apparatus for eliminating this burr formation is disclosed in copending U.S. Pat. application Ser. No. 623,289 filed Oct. 17, 1975 "Apparatus for Shaping a Slit Product." Both applications herein referred to are assigned to the assignee of this application and their disclosures are incorporated by reference. The apparatus disclosed in this copending application consists of a pair of revolving rolls. One roll contains a continuous annular groove having a curved bottom portion and a second roll has a continuous annular land adapted to engage the groove so as to force the product into curved bottom portion thereby shaping the slit product cross-section. Although this apparatus successfully eliminated burr formation in an off-line discontinuous mode, it could not be used in line with a slitter in a continuous mode. Such a discontinuous arrangement is an uneconomical process because special payoff and rewinding equipment and extra labor is needed.

This problem of rewinding and paying off was compounded when multiple ends were shaped for burr elimination. It became apparent that a process was needed wherein this shaping apparatus could be used inline with a slitter so that a continuous operation of slitting and shaping could be performed.

The present invention enables slit wire having a small cross-sectioned area and a burr formation to be shaped into a burr-free product in a continuous manner after slitting.

SUMMARY OF THE INVENTION

The present invention relates to a method for shaping the cross-section of a slit product. The slit product has a small cross-sectional area and is further characterized by a burr formation. After slitting the product is fed into a pair of revolving rolls positioned in engaging relationship wherein one roll contains a continuous annular groove having a curved bottom portion and a second roll has a continuous annular land. A critical feature of this invention is the step of feeding the slit product into the rolls at a specific angle of 7°–30° with the tangent plane of the rolls.

It is therefore an object of this invention to provide a method for shaping the cross-section of a slit product.

A still further object of this invention is to provide a method for eliminating the burr formation on a slit product.

BRIEF DESCRIPTION OF THE DRAWINGS

FIG. 4 is a front elevational view showing a slit product being shaped by a pair of revolving rolls.

FIG. 5A is a side elevational view taken through the plane 5—5 of FIG. 4 showing a slit product feeding into the revolving rolls at an angle approximately equal to the tangent plane.

FIG. 5B is a side elevational view taken through the plane 5—5 of FIG. 4 showing a slit product feeding into the revolving rolls at an angle within the range of 7° to 30° to the tangent plane.

FIG. 5C is a side elevational view taken through the plane 5—5 of FIG. 4 showing a slit product feeding into the revolving rolls at an angle greater than 30° to the tangent plane.

FIG. 6 shows the cross-section of the product being fed into the rolls of FIG. 5A.

FIG. 7 shows the cross-section of the product being fed into the rolls of FIG. 5C.

DETAILED DESCRIPTION OF THE PREFERRED EMBODIMENT

The present invention provides a method for shaping the cross-section of a slit product. A better understanding of this invention can be obtained by reference to the accompanying figures.

Figure 1:
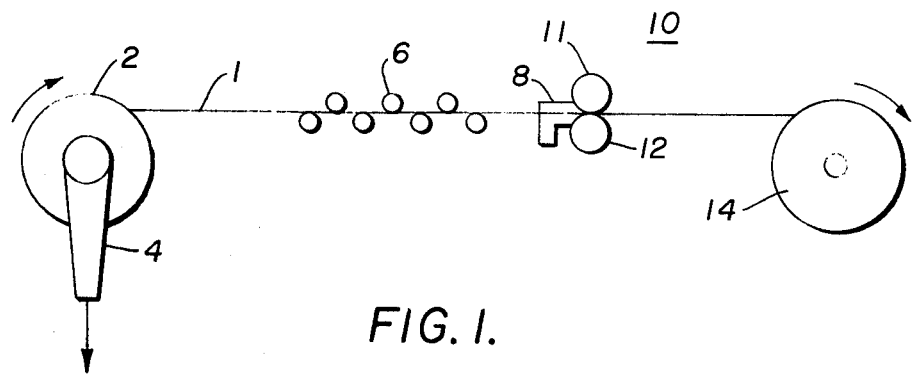
FIG. 1 is a schematic of a prior art method for shaping the cross-section of a slit product.

FIG. 1 illustrates shaping of a slit product in a discontinuous mode, that is an off-line operation, which is separate and distinct from the slitting operation. In this figure a slit product 1 is unwound from a coil positioned on a payoff drum 2, controlling the rate of payoff and tension in the coil is a drag brake 4 shown as exerting force F. A roll straightener 6 further controls tension fluctuations in the small-cross section product. The product then enters a guide 8 for feeding and guiding it into the nip of a shaping apparatus 10 consisting of upper roll 11 and lower roll 12. The shaped product is thereafter collected on take-up spool 14.

The arrangement illustrated in FIG. 1, proved satisfactory on a small scale, laboratory basis. Scale-up to a production mode showed that this system was not practical. Payoff and take-up problems coupled with labor costs and excessive material handling severely limited product shaping by this process.

Figure 2:
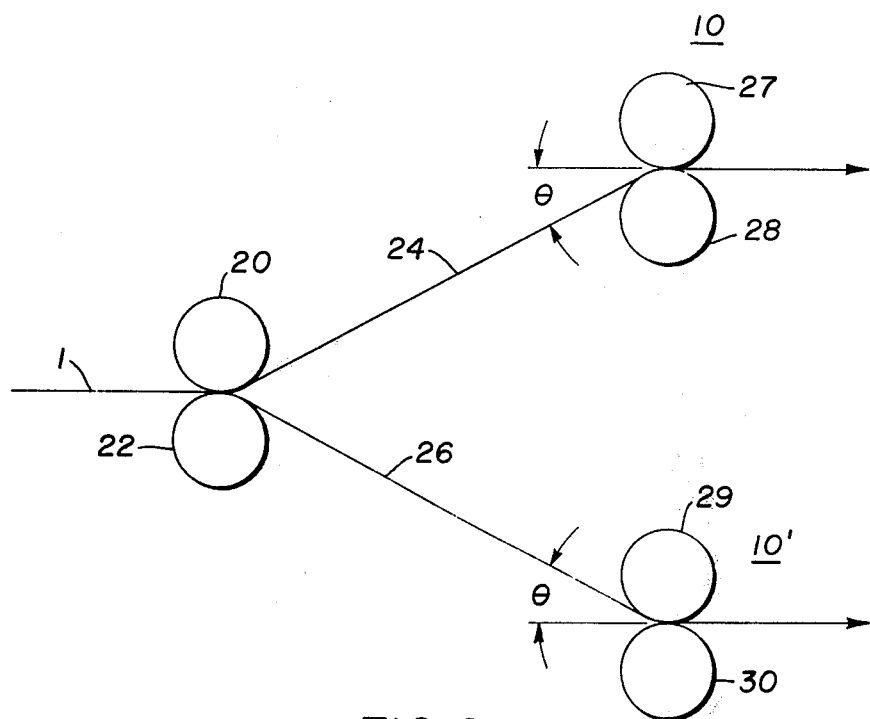
FIG. 2 is a schematic illustrating the method of this invention for shaping the cross-section of a slit product having an aspect ratio less than 4:1.
Figure 3:
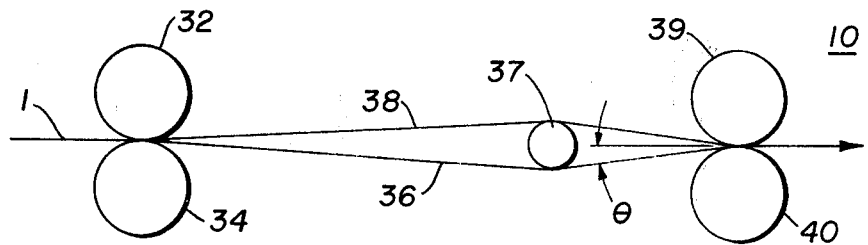
FIG. 3 is a schematic illustrating the method of this invention for shaping the cross-section of a slit product having an aspect ratio greater than 4:1.

It was decided to place the shaping apparatus 10 shown in FIG. 1 in line with the slitter. FIGS. 2 and 3 illustrate this arrangement. In FIG. 2 unslit metallic coil stock 1 such as steel is fed into a pair of slitting cutters 20 and 22 thereby producing a plurality of slit multiples 24 and 26. Burrs are formed in a definite pattern when the multiples separate from each other. For example, if the burr formed on the outermost multiple is oriented on the bottom surface, then the burr formed on the top surface and its location will alternate across the width of the strip. The location of the burr determines the orientation of the product in the shaping rolls. A pair of shaping apparatus 10 and 10' are provided in the embodiment shown in FIG. 2. Each shaping apparatus is designed to accommodate a specific burr formation.

For example, upper shaping 10 consisting of rolls 27 and 28 can eliminate burrs that are oriented on the bottom surfaces of the slit-multiples while lower shaping apparatus 10', consisting of rolls 29 and 30 can eliminate those burrs that are oriented on the upper surfaces of the slit multiples. The arrangement shown in FIG. 2 is particularly well suited for shaping slit products having an aspect ratio of less than 4:1, wherein aspect ratio is defined as the ratio of the width of the slit product to the thickness of the slit product.

FIG. 3 is a modification of the arrangement of the slitter and shaping equipment illustrated in FIG. 2. This arrangement consists of slitting cutters 32 and 34, a deflection bar 37 and shaping apparatus 10. Unslit steel coil stock 1 is fed into a pair of slitting cutters 32 and 34 producing a plurality of slit multiples 36 and 38. The slit product that emerges from the top cutter 32 is directed under the deflection bar 37 and into the grooves of the lower shaping roll 40. In a like-manner the slit product that emerges from the bottom cutter 34 is directed over the deflection bar 37 and into the grooves of the top shaping roll 39. By directing the slit product in this manner proper orientation of the burr formation within the shaping apparatus will be maintained. This arrangement has proved to be most satisfactory for shaping slit products having an aspect ratio greater than about 4:1.

In both embodiments of this invention the slit product is guided into the grooved roll in such a manner that the burr formation is oriented into the bottom of the groove. The burr is then eliminated by shaping that portion of the slit product cross-section.

In FIGS. 2 and 3 the slit products are shown as entering the shaping apparatus at an angle $\theta$. This is the angle formed by the slit product and an imaginary plane tangent to the shaping rolls. This angle is a critical feature of this invention and if the slit product does not enter the shaping apparatus at an angle within a specified range, the method of this invention is not operable. It has been determined that the angle $\theta$ must be at least 7° and not more than 30°. The significance of this entry angle can best be understood by reference to FIGS. 4 through 7.

FIG. 4 shows the shaping apparatus 10 of FIGS. 2 and 3 as consisting of a grooved roll 50 having a curved bottom portion and a forming roll 52 having a continuous annular land adapted to cooperate with the groove of roll 50 and is further described in copending Pat. application Ser. No. 623,289, filed Oct. 17, 1975. This figure shows slit product 1, a steel wire or ribbon having a burr formation 51, oriented in the curved bottom portion of grooved roll 50.

When the land portion contacts the top surface of slit product 1, it forces the burr formation 51 against the curved bottom portion of the groove thereby reshaping the cross-section of the slit product.

FIG. 5A shows slit product 1 entering the shaping apparatus 10 at an angle of approximately 0° to a plane tangent to rolls 50 and 52. The hatched or shaded section of the slit product shows the area of contact between the product and the groove of roll 50. It has been determined that this area is too small to maintain the product within the groove in order to rotate within the groove. Any vibration of the equipment will cause the product to rotate in a manner as shown in FIG. 6 and either ride out of the groove or cause misorientation of the burr. The burr will no longer be oriented in the bottom portion of the groove and proper shaping of the cross-section will not be achieved.

FIG. 5B shows a slit product 1 entering shaping apparatus 10 at an angle to the plane tangent to rolls 50 and 52 greater than about 7° but not more than about 30°. As the entry angle is increased the area of contact (hatched area) between the product and the groove of roll 50 has been increased substantially over that illustrated in FIG. 5A. The area of contact 1 is not sufficient for the slit product to resist any tendency to twist or rotate within the grooved roll. Orientation of the burr formation can now be readily maintained and satisfactory shaping of the product cross-section will be achieved.

FIG. 5C shows a slit product 1 entering shaping apparatus 10 at an angle to the plane tangent to rolls 50 and 52 greater than 30°. It can be seen how much the area of contact between the slit product and the groove of roll 50 has increased over that illustrated in FIG. 5B. This area is now so large that frictional forces tend to prevent seating of the slit product in the groove. This tendency can cause the product to ride out of the groove and become cut, folded or damaged as it enters the roll nip. FIG. 7 illustrates how the product may move within the groove. Movement of the product in such a manner prevents proper orientation of the burr formation and shaping of the cross-section is virtually negated.

The method of this invention as described herein and illustrated by FIGS. 2, 3 and 5B has effectively shaped the cross-section of a slit product directly after slitting.

Although the present invention has been described and illustrated in connection with the preceding preferred embodiment, it is to be understood that modifications and variations may be resorted to without departing from the spirit of the invention as those skilled in the art will readily understand. Such modifications and variations are considered within the scope of the present invention as defined by the appended claims.

We claim:
1. A method for shaping a slit product having a burr formation, comprising the steps of:
positioning in engaging relationship a pair of revolving rolls wherein one roll contains a continuous annular groove having a curved bottom position and a second roll has a continuous annular land; and
feeding said slit product into said rolls at an angle of 7°–30° with the tangent plane of said rolls and in such a manner that said burr formation is oriented in said curved bottom position.

* * * * *